US012810208B2

(12) United States Patent
Månsson et al.

(10) Patent No.: US 12,810,208 B2
(45) Date of Patent: Nov. 24, 2026

(54) LANE-ASSIGNMENT FOR TRAFFIC OBJECTS ON A ROAD

(71) Applicant: ZENSEACT AB, Gothenburg (SE)

(72) Inventors: Olle Månsson, Gothenburg (SE); Willem Verbeke, Gothenburg (SE)

(73) Assignee: ZENSEACT AB, Gothenburg (SE)

(*) Notice: Subject to any disclaimer, the term of this patent is extended or adjusted under 35 U.S.C. 154(b) by 548 days.

(21) Appl. No.: 18/476,419

(22) Filed: Sep. 28, 2023

(65) Prior Publication Data

US 2024/0135252 A1 Apr. 25, 2024
US 2024/0232715 A9 Jul. 11, 2024

(30) Foreign Application Priority Data

Oct. 19, 2022 (EP) .................................... 22202398

(51) Int. Cl.

*G06N 20/00* (2019.01)
*G08G 1/16* (2006.01)
*B60W 60/00* (2020.01)

(52) U.S. Cl.

CPC ............. *G06N 20/00* (2019.01); *G08G 1/167* (2013.01); *B60W 60/001* (2020.02); (Continued)

(58) Field of Classification Search

CPC ... G06N 20/00; G08G 1/167; B60W 2556/45; B60W 2555/60; B60W 60/001; B60W 2552/10; B60W 2420/403; B60W 2520/10

See application file for complete search history.

(56) References Cited

U.S. PATENT DOCUMENTS 12,258,008 B1 * 3/2025 Kurutach ........... B60W 60/0011
12,330,639 B1 * 6/2025 Ferencz ................ B60W 10/18
(Continued)

FOREIGN PATENT DOCUMENTS

CN 108995654 B 4/2020
CN 108995655 B 4/2020
WO 2022179396 A1 9/2022

OTHER PUBLICATIONS

Nguyen, Anh, et al.; "Deep Federated Learning for Autonomous Driving"; arxiv.org; Cornell University Library, 201 Olin Library, Cornell University, Ithaca, NY 14853; Apr. 19, 2022; XP091195047; 7 pages.

(Continued)

*Primary Examiner* — Stephen T Gundry
(74) *Attorney, Agent, or Firm* — Sage Patent Group

(57) ABSTRACT

A method, system, a vehicle and a computer-readable storage medium for lane assignment of a roadside traffic object present on a road. The method includes obtaining sensor data of an ego vehicle comprising an Automated Driving System (ADS) and traveling on the road. The method further includes identifying the roadside traffic object in the surrounding environment of the ego vehicle and determining a change in a driving behavior of the ego vehicle being present in the surrounding environment of the ego vehicle. The method further includes determining a co-occurrence of the identification of the at least one roadside traffic object and determination of the change in the driving behavior of the ego vehicle. The method further includes if the co-occurrence is determined, generating a corresponding image annotation for one or more obtained images of the at least one identified roadside traffic object.

15 Claims, 3 Drawing Sheets

(52) U.S. Cl.
CPC ... *B60W 2420/403* (2013.01); *B60W 2520/10* (2013.01); *B60W 2552/10* (2020.02); *B60W 2555/60* (2020.02); *B60W 2556/45* (2020.02)

(56) References Cited

U.S. PATENT DOCUMENTS

| | | | | |
|---|---|---|---|---|
| 12,485,898 | B1 * | 12/2025 | Sun | B60W 30/18163 |
| 2024/0232715 | A9 * | 7/2024 | Månsson | G06V 20/582 |
| 2024/0246540 | A1 * | 7/2024 | Censi | B60W 30/18159 |
| 2024/0262393 | A1 * | 8/2024 | Abad | B60W 60/0027 |
| 2024/0321104 | A1 * | 9/2024 | Ran | G08G 1/0141 |
| 2024/0359710 | A1 * | 10/2024 | Shalev-Shwartz | B60W 60/00276 |
| 2024/0361148 | A1 * | 10/2024 | Akbarzadeh | G06V 20/584 |
| 2024/0391494 | A1 * | 11/2024 | Rosenblum | B60W 60/001 |
| 2025/0078927 | A1 * | 3/2025 | Yu | G06T 7/20 |
| 2025/0206354 | A1 * | 6/2025 | Weast | B60W 30/095 |
| 2025/0218194 | A1 * | 7/2025 | Liong | G05D 1/024 |
| 2025/0225871 | A1 * | 7/2025 | Ran | G08G 1/052 |
| 2025/0239043 | A1 * | 7/2025 | Luo | G06V 10/82 |
| 2025/0249909 | A1 * | 8/2025 | Caesar | B60W 40/02 |
| 2025/0278091 | A1 * | 9/2025 | Sajjan | G06N 3/045 |
| 2025/0285451 | A1 * | 9/2025 | Saggu | G06V 20/70 |
| 2025/0304040 | A1 * | 10/2025 | Abad | B60W 30/09 |
| 2025/0321121 | A1 * | 10/2025 | Aviel | G01C 21/3859 |
| 2025/0329252 | A1 * | 10/2025 | Golestani | G08G 1/0116 |
| 2026/0024354 | A1 * | 1/2026 | Kabkab | G06V 20/582 |

OTHER PUBLICATIONS

Nartey, Obed, et al.; "Robust Semi-Supervised Traffic Sign Recognition via Self-Training and Weakly-Supervised Learning"; Sensors, vol. 20, No. 9; May 8, 2020; XP093022640; https://www.ncbi.nlm.nih.gov/pmc/articles/PMC7248915/pdf/sensors-20-02684.pdf; 24 pages.

Extended European Search Report mailed Mar. 28, 2023 for European Application No. 22202398.8, 7 pages.

* cited by examiner

LANE-ASSIGNMENT FOR TRAFFIC OBJECTS ON A ROAD

CROSS-REFERENCE TO RELATED APPLICATIONS

The present application for patent claims priority to European Patent Office Application Ser. No. 22202398.8, entitled "LANE-ASSIGNMENT FOR TRAFFIC OBJECTS ON A ROAD" filed on Oct. 19, 2022, assigned to the assignee hereof, and expressly incorporated herein by reference.

TECHNICAL FIELD

The present disclosure relates to methods and systems for assigning at least one roadside traffic object on a road to one or more of the lanes of the road. More specifically, embodiments and aspects of the present disclosure relate to association of traffic objects being present in a surrounding environment of an ego vehicle travelling on the road to a lane of one or more lanes of the road as well as to generating training data for a machine learning algorithm for association of traffic objects to the lane of the one or more lanes of the road.

BACKGROUND OF THE INVENTION

During the last few years, the research and development activities related to autonomous vehicles have exploded in number and many different approaches are being explored. An increasing portion of modern vehicles have advanced driver-assistance systems (ADAS) to increase vehicle safety and more generally road safety. ADAS—which for instance may be represented by adaptive cruise control (ACC) collision avoidance system, forward collision warning, etc.—are electronic systems that may aid a vehicle driver while driving. Today, there is ongoing research and development within a number of technical areas associated to both the ADAS and the Autonomous Driving (AD) field. ADAS and AD will herein be referred to under the common term Automated Driving System (ADS) corresponding to all of the different levels of automation as for example defined by the SAE J3016 levels (0-5) of driving automation, and in particular for level 4 and 5.

In a not too distant future, ADS solutions are expected to have found their way into a majority of the new cars being put on the market. An ADS may be construed as a complex combination of various components that can be defined as systems where perception, decision making, and operation of the vehicle are performed by electronics and machinery instead of or in tandem with a human driver, and as introduction of automation into road traffic. This includes handling of the vehicle, destination, as well as awareness of surroundings. While the automated system has control over the vehicle, it allows the human operator to leave all or at least some responsibilities to the system. An ADS commonly combines a variety of sensors to perceive the vehicle's surroundings, such as e.g., radar, LIDAR, sonar, camera, navigation system e.g., GPS, odometer and/or inertial measurement units (IMUs), upon which advanced control systems may interpret sensory information to identify appropriate navigation paths, as well as obstacles, free-space areas, and/or relevant signage.

It is imperative for autonomous and semi-autonomous vehicles to identify the roadside traffic objects such as traffic signs on the road and further provide the definitions and associated information with the identified traffic objects to the controlling operator of the vehicle. For instance accurate knowledge of the current speed limit on the road and definition of various speed limit traffic signs are amongst the required information for safe and untroubled maneuvering of vehicles on roads. Even if traffic objects could be detected with the currently available techniques, a difficult problem to solve still remains for determining whether a particular traffic object belongs to a specific lane or the road on which the vehicles are driving. This problem can grow exponentially when considering multiple roads located next to each other, each road having multiple lanes or in scenarios involving a crossing between different roads. Currently, solving the above-mentioned problem relies heavily on complicated logic-based solutions.

There is thus a pressing need in the art for new and improved solutions for identification and lane-assignment of various traffic objects on roads with high accuracy and speed.

SUMMARY OF THE INVENTION

It is therefore an object of the present disclosure to provide a system, a vehicle comprising such a system, a method, and a computer-readable storage medium, which alleviate all or at least some of the drawbacks of presently known solutions.

More specifically, it is an object of the present disclosure to alleviate problems related to association of roadside traffic objects on a road and in a surrounding environment of a vehicle travelling on the road to a specific lane of one or more lanes of a specific road.

These objects are achieved by means of a system, a vehicle comprising such a control system, a method, and a computer-readable storage medium, as defined in the appended independent claims. The term exemplary is in the present context to be understood as serving as an instance, example or illustration.

According to a first aspect of the present disclosure, there is provided a method for generating training data for a machine learning, ML, algorithm configured for assigning at least one roadside traffic object on a road having one or more lanes, to a lane of the one or more lanes.

The method comprises obtaining sensor data from a sensor system of an ego vehicle comprising an Automated Driving System, ADS, and traveling on the road, the sensor data comprising one or more images, captured by a vehicle-mounted camera, of a surrounding environment of the ego vehicle. The method further comprises identifying the at least one roadside traffic object in the surrounding environment of the ego vehicle based on the obtained sensor data. Further, the method comprises determining a change in a driving behavior of the ego vehicle and/or of at least one external vehicle being present in the surrounding environment of the ego vehicle, on a respective lane on which the ego vehicle and/or the at least one external vehicle is traveling based on the obtained sensor data. The sensor data comprises information indicative of a speed of the ego vehicle and/or of the at least one external vehicle. The change in the driving behavior is correlated with a meaning of the at least one identified roadside traffic object. The method further comprises determining a co-occurrence of the identification of the at least one roadside traffic object and determination of the change in the driving behavior of the ego vehicle and/or of the at least one external vehicle. In an instance of such co-occurrence, i.e., if the co-occurrence is determined, the method further comprises generating a corresponding image annotation for one or more obtained images of the at least one identified roadside traffic object to indicate association of the at least one identified roadside traffic object to that lane, of the one or more lanes, associated with the determined change in the driving behavior of the ego vehicle 1 and/or of the at least one external vehicle. The method further comprises forming a training data set for the ML algorithm based at least on the one or more obtained images of the at least one identified roadside traffic object, and the generated image annotation of the at least one traffic object.

When it comes to autonomous vehicles, an accurate identification and lane-assignment of traffic objects on the road is of great importance in order to make safe decisions without endangering a vehicle's occupants or external objects, particularly when using the autonomous driving features. By lane-assignment or lane-association of a traffic object in the present context it is means identification of a roadside traffic object and accurately assigning the identified traffic object to one specific lane among one or more lanes of a road, on which road the vehicle, i.e., the ego vehicle is travelling. Additionally or alternatively, the identified traffic object may be assigned to one specific road among a plurality of roads or to a specific lane of that road. The identified at least one traffic object may be assigned to a lane of the ego vehicle, also referred to as the ego-lane, which is to be construed as the lane on which the ego vehicle is travelling. The identified at least one traffic object may alternatively or additionally be assigned to another lane of the one or more lanes of the road being different from the ego-lane based on observing a behavior of one or more external vehicles travelling on their respective lane.

Accordingly, the inventors have realized that by using a data-driven approach comprising the use of ML algorithms, accuracy, scalability, speed and reproducibility can be achieved in identification and association of roadside traffic objects to their respective lanes. The data-driven approach of the present disclosure is also easier to maintain compared to any rule-based approach or any algorithm based on human intuition. Furthermore, even though the rule-based approaches may be capable of determining and assigning some of the straightforward traffic objects to specific lanes, they often are brittle, difficult to maintain and fall short in real-world scenarios involving more complex environmental conditions and traffic situations. Thus, by training and employing the machine learning algorithms according to the embodiments of the present disclosure, an efficient and accurate approach for identification and association of roadside traffic objects to their respective lanes among a plurality of lanes of one or more roads is provided.

Further, the versatility of the proposed solution establishes the proposed methods, and corresponding system and vehicle to be readily adaptable for varying traffic situations or road and transportation infrastructure in different countries.

According to some embodiments, the method may further comprise obtaining information associated with the at least one identified traffic object indicative of geographical position and orientation of the at least one identified roadside traffic object. The method may further comprise obtaining a geometry of the road comprising number of the one or more lanes and a geographical position and orientation of each of the one or more lanes of the road based on the obtained sensor data and/or an obtained map data of the road. Thus, the method may further comprise generating the corresponding image annotation and/or forming the training data set for the ML algorithm further based on the obtained information associated with the at least one identified traffic object and/or the obtained a geometry of the road.

In several embodiments the method may further comprise transmitting the formed training data set to a remote server for centrally training the ML algorithm.

Even further, in several embodiments the method may further comprise training the ML algorithm in a decentralized federated learning setting performed in the ego vehicle by updating one or more model parameters of the ML algorithm based on the formed training data set.

The method may thus further comprise transmitting the one or more updated model parameters of the ML algorithm to a remote server and receiving a set of globally updated model parameters of the ML algorithm from the remote server, wherein the set of globally updated parameters are based on information comprising the one or more updated model parameters of the ML algorithm obtained from a plurality of ego vehicles. The method may further comprise updating the ML algorithm based on the received set of globally updated model parameters.

In several embodiments, the training data set for the ML algorithm may be formed based on a single training data point acquired at a single timestamp or as a series of training data points acquired at a plurality of timestamps.

According to a second aspect of the present disclosure there is provided a (non-transitory) computer-readable storage medium storing one or more programs configured to be executed by one or more processors of a processing system, the one or more programs comprising instructions for performing the method according to any one of the embodiments of the method disclosed herein.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

According to a third aspect of the present disclosure, there is provided a computer program product comprising instructions which, when the program is executed by one or more processors of a processing system, causes the processing system to carry out the method according to any one of the embodiments of the method disclosed herein.

According to a further fourth aspect, there is provided a system for generating training data for a machine learning, ML, algorithm configured for assigning at least one roadside traffic object on a road having one or more lanes, to a lane of the one or more lanes. The system comprises processing circuitry configured to obtain sensor data from a sensor system of an ego vehicle comprising an Automated Driving System, ADS, and traveling on the road, the sensor data comprising one or more images, captured by a vehicle-mounted camera, of a surrounding environment of the ego vehicle. The processing circuitry is further configured to identify the at least one roadside traffic object in the surrounding environment of the ego vehicle based on the obtained sensor data. Further, the processing circuitry is configured to determine a change in a driving behavior of the ego vehicle and/or of at least one external vehicle, being present in the surrounding environment of the ego vehicle, on a respective lane on which the ego vehicle and/or the at least one external vehicle is traveling based on the obtained sensor data, wherein the sensor data comprises information indicative of a speed of the ego vehicle and/or of the at least one external vehicle. The change in the driving behavior is correlated with a meaning of the at least one identified roadside traffic object. The processing circuitry is configured to determine a co-occurrence of the identification of the at least one roadside traffic object and determination of the change in the driving behavior of the ego vehicle and/or of the at least one external vehicle. If the co-occurrence is determined, the processing circuitry is further configured to generate a corresponding image annotation for one or more obtained images of the at least one identified roadside traffic object to indicate association of the at least one identified roadside traffic object to that lane, of the one or more lanes, associated with the determined change in the driving behavior of the ego vehicle and/or of the at least one external vehicle. The processing circuitry is further configured to form a training data set for the ML algorithm based at least on the one or more obtained images of the at least one identified roadside traffic object, and the generated image annotation of the at least one traffic object.

According to yet another fifth aspect, there is provided a vehicle comprising one or more vehicle-mounted sensors configured to monitor a surrounding environment of the vehicle. The vehicle further comprises a localization system configured to monitor a pose of the vehicle, i.e., geographical position and heading of the vehicle on a road. The vehicle further comprises a system according to the fourth aspect and various embodiments of the fourth aspect. The vehicle may further comprise an ADS system for controlling one or more of acceleration, steering, and braking of the vehicle.

Further embodiments of the different aspects are defined in the dependent claims.

It is to be noted that all the embodiments, elements, features and advantages associated with the first aspect also analogously apply to the second, third, fourth and the fifth aspects of the present disclosure.

These and other features and advantages of the present disclosure will in the following be further clarified in the following detailed description.

BRIEF DESCRIPTION OF THE DRAWINGS

Further objects, features and advantages of embodiments of the disclosure will appear from the following detailed description, reference being made to the accompanying drawings. The drawings are not to scale.

DETAILED DESCRIPTION

Figure 1:
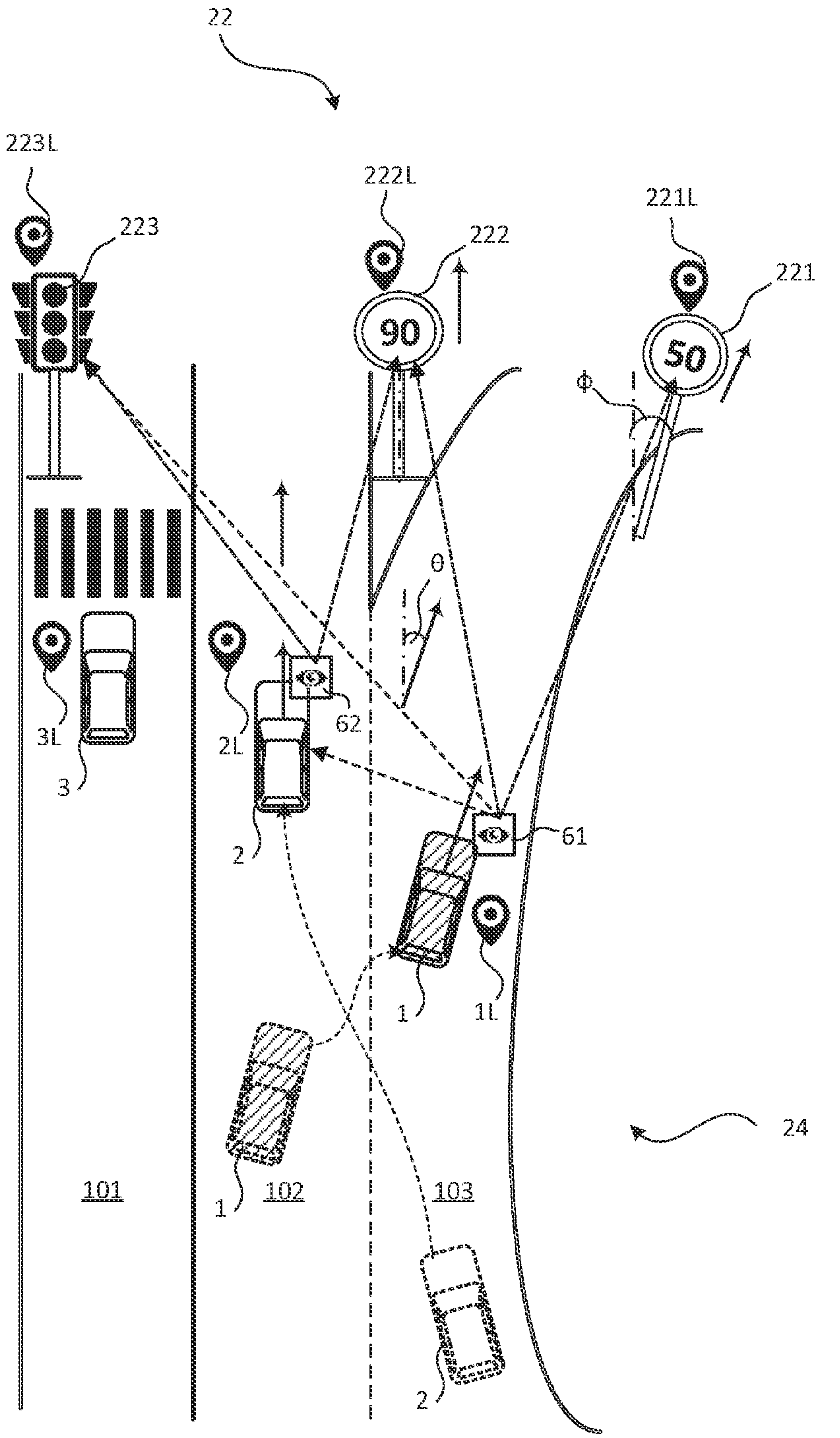
FIG. 1 shows a schematic top view of a road and at least one vehicle traveling on the road in accordance with several embodiments of the present disclosure.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components. Even though the following disclosure mainly discusses vehicles in the form of cars, the skilled reader readily realizes that the teachings discussed herein are applicable to other forms of vehicles such as trucks, buses or construction equipment.

FIG. 1 illustrates a schematic perspective top view of a vehicle 1 in a hatched line shaded pattern. The vehicle 1 may also be referred to as the ego vehicle 1. Moreover, FIG. 1 shows vehicles 2 and 3 may be referred to as at least one external vehicle 2, 3 here in. The ego vehicle 1 and the external vehicles 2, 3 are travelling on a road portion 22 of road 24 which in this example comprises roadside traffic objects 221, 222, 223.

The road 24 comprises one or more lanes such as lanes 101, 102 and 103. The vehicle 1 is shown to have been driving on lane 102 of the road 24 but has later made an exit towards lane 103 (dashed trajectory). Vehicle 2 however in this example enters lane 102 from the exit lane 103 (dashed trajectory). Lane 102 has speed limit sing 222 at 90 km/hour and the exit lane 103 has a speed limit sign 221 at 50 km/hour erected thereon. Vehicle 3 is located on lane 101 but is at a standstill at the traffic light 223.

The vehicle 1 or the at least one external vehicle 2, 3 may comprise an Automated Driving System (ADS). In the present context, the ADS comprises both ADAS and AD systems. In some embodiments, the ADS of the ego vehicle 1 may comprise one or more ADS features that are preferably a level 2 feature or higher according to SAE J3016 levels of driving automation for on-road vehicles. In the present context, an ADS feature may be in the form of an autopilot feature, a traffic jam pilot, a highway pilot, or any other SAE J3016 level 2+ ADS feature. In various implementations, the vehicles with low-level ADS systems such as ADS level 0-3 may be vehicles having ADAS systems capable of employing their integrated sensor systems, etc. for surveillance of the surrounding environment of the vehicle, displaying information such as warning signals etc. to the driver of the vehicle. The ego vehicle in some embodiments may be equipped with high-level ADS systems such as level 4-5 having AD systems for autonomously controlling steering functions of the ego vehicle 1. The external vehicles 2, 3 on the road such may be equipped with any level of ADS systems or lack such systems entirely. In some embodiments and implementations, there might be more than one ego vehicle 1 travelling on a same portion 22 of the road 24 simultaneously or at different times and thus data from one or more ego vehicles 1 may be collected and analyzed.

The ego vehicle 1 comprises a control system 10 which may be implemented as an independent unit or be a part of the overall ADS architecture of the vehicle, or may accordingly be a module or component of the ADS. The control system 10 of the vehicle 1 comprises control circuitry 11 or processing circuitry 11 configured to obtain data comprising information about the surrounding environment of the vehicle 1. The vehicle may also be provided with a localization system 5 which in communication with the control system 10 are configured to provide an estimation of the ego vehicle's 1 state or pose, i.e., vehicle's geographical position and heading on the road 22. The term obtaining is herein to be interpreted broadly and encompasses receiving, retrieving, collecting, acquiring, and so forth.

The state of the vehicle in the context of this disclosure may be construed as having three physical states, namely the longitude, the latitude and the heading of the vehicle. The longitude and the latitude are defined with respect to a geographical coordinate system such as the Cartesian coordinate system and indicate the longitudinal position and lateral position of the vehicle on the road portion. The heading of the vehicle indicates the compass direction of the vehicle with respect to the geographical north (not shown) and is typically understood as an angular orientation (θ) of the vehicle. The state of the vehicle may also be referred to as a pose of the vehicle. The pose is in some embodiments represented by a 2D Cartesian position and a yaw of the vehicle (x, γ, θ). However, in some embodiments, the pose is a 6D pose where the position is defined by a 3D Cartesian position and the orientation is defined by a roll, pitch, and yaw of the vehicle.

The roadside traffic objects 221-223 may be any one of a speed limit sign or any other traffic sign or traffic signal which can be identified by the ego vehicle 1 and/or by the at least one external vehicle 2, 3 at the time of encounter. In some examples, the at least one roadside traffic object 221-223 may be noticed by a driver of the ego vehicle 1 and/or the one or more external vehicles 2, 3. The roadside traffic object in the present context may generally be construed as comprising traffic signs, traffic signals such as traffic lights, warning signals etc., speed bumps, or any traffic object associated with the road 24.

In several examples and embodiments the road 24 may be any type of road e.g., a motorway, freeway or expressway. The road may also be a country road, rural road or any other carriageway. The road 24 may have a plurality of lanes such as more than one lane in the same travelling direction e.g., two or more lanes or at least one lane in each travelling direction as is usually the case for rural roads. Plurality of roads such as crossing or parallel roads may also be located in the same geographical area with vehicles travelling thereon, to which the proposed methods and systems herein similarly apply.

Figure 2:
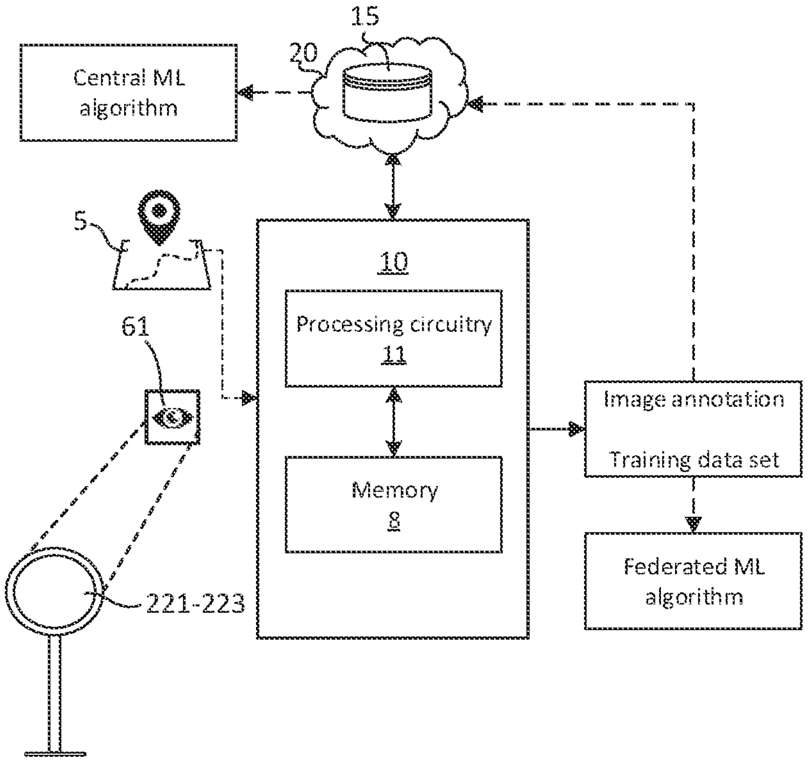
FIG. 2 shows a schematic block diagram of a control system of the vehicle in accordance with several embodiments of the present disclosure.

In some embodiments and aspects, for instance as shown in FIG. 2, the control system 10 of vehicle 1 may further be configured to determine the geographical position and heading of the vehicle on the road portion 22 based on data from the localization system 5 comprising positioning data indicating a pose, i.e., geographical position and orientation, of the vehicle on the road 24, and/or based on map data associated with the road portion 22 and sensor data obtained by the from a perception system, i.e., sensor system 61 of the ego vehicle 1. In several embodiments, the vehicle may utilize a localization system 5 in the form of a suitable satellite based positioning systems, such as either one of a GNSS or a corresponding regional system such as e.g., a GPS, Globalnaya Navigazionnaya Sputnikovaya Sistema (GLONASS), Galileo, Beidou, etc.

The localization system 5 may comprise or be associated with an HD-map module. An HD-map is in the present context to be understood as map comprising data with highly accurate and realistic representations of the road travelled upon by the ego vehicle 1. In more detail HD-maps may be understood as maps that are particularly built for autonomous driving purposes. These maps have an extremely high precision, oftentimes at a centimeter-level. Moreover, the maps generally contain information such as where the lanes are, where the road boundaries are, where the curves are, how high the curves are, and so forth.

The control system 10 may in various aspects and embodiments comprise or be associated with an Inertial Measurement Unit (IMU). An IMU may be understood as a device configured to detect linear acceleration using one or more accelerometers and rotational rate using one or more gyroscopes. Thus, in some embodiments, the sensor data may be in the form of sensor data obtained from the IMU. The output from the IMU is then used to estimate a change in the vehicle's pose over time. The obtained sensor data may additionally comprise information about a state of one or more other external vehicles in the surrounding environment of the ego-vehicle, lane marker geometry on the one or more lanes of the road 24, lane marker type (e.g., solid, dashed, double marker, etc.) on the road 24, traffic object information 221-223, road barrier information such as presence or characteristics of speed bumps or any other road obstruction objects, etc.

In several aspect and embodiments, the control system 10 or processing unit 10 of ego vehicle 1 is configured for assigning the at least one roadside traffic object 221-223 on a road 24 having one or more lanes 101-103, to a lane, i.e., a specific lane of the one or more lanes 101-103 as shown in FIG. 2. For example in FIG. 1, the traffic sign 221 is a speed limit sign indicating speed limit 50 km/hour and is associated to, i.e., belongs to the lane 103. Similarly, traffic sign 222 is a speed limit sign at 90 km/hour and belongs to lane 102. The traffic signal 223 is a traffic light 223 and belongs to traffic lane 101 of road 24. The traffic objects 221-223 are arranged at the road portion 22 of the road 24 on which the ego vehicle 1 and the at least one external vehicle 2, 3 are travelling.

In several aspect and embodiments, the control system 10 of the ego vehicle 1 may be configured for generating training data for a machine learning, ML, algorithm, wherein the ML algorithm is configured for assigning the at least one roadside traffic object 221-223 on the road 24 having one or more lanes 101-103, to a lane, i.e., a specific lane of the one or more lanes 101-103.

The control system 10 is configured for obtaining sensor data from a sensor system 61 of the ego vehicle 1. In several embodiments, the sensor data comprises one or more images which may be captured by a vehicle-mounted camera 61 (not shown) as a part of the sensor system 61. The captured images may be stored locally in a memory 8 of the ego vehicle 1 and/or be transmitted to an external network 20 like a cloud network 20 or a remote server 15 comprised in or in communication with the external network 20, with which the ego vehicle 1 is in communication. The camera 61 in the present context also includes a plurality of vehicle-mounted cameras 61 (not shown) mounted on several parts of the ego vehicle 1 for capturing images of the surrounding environment of the ego vehicle 1. In several embodiments the control system 10 may be configured for obtaining information indicative of a speed of the ego vehicle 1 and/or speed of the at least one external vehicle 2, 3 being present in the surrounding environment of the ego vehicle 1. The information indicative of the speed of the vehicles may be provided by the processing circuitry 11 of the control system 10 by processing the obtained sensor data by the sensor system 61 of the ego vehicle 1. In further embodiments, the sensor data may further comprise information from vehicle sensors other than the cameras 61 such as LIDARs, radar, etc. Accordingly, precise LIDAR or radar measurements of distances to traffic objects 221-223 could be obtained in addition to camera images, improving the accuracy of the data collection.

In several embodiments and aspect, the control system 10 of the ego vehicle 1 is configured to identify the at least one roadside traffic object 221-223 in the surrounding environment of the ego vehicle 1 based on the obtained sensor data.

Further, the control system 10 may be configured for obtaining information indicative of a geographical position and orientation of the at least one identified roadside traffic object 221-223. In the example of FIG. 1, the traffic sign 221 has a location 221L and is erected on the roadside of lane 103 at an orientation, i.e., angular position or rotation (φ) with respect to an imaginary reference plane (not shown). Similarly, sign 222 has a location 222L and is erected parallel to the imaginary reference plane, directly facing the vehicle front of the vehicle 2 in FIG. 1. The traffic light 223 has a location 223L and faces the vehicle front of the external vehicle 3. Such information regarding the location and orientation of the at least one traffic object 221-223 may be obtained from the localization system 5 or calculated by the processing circuitry of the control system 10 based on the obtained sensor data from the perception system 61.

The control system 10 may further be configured to obtain a geometry of the road 24 and the road portion 22, e.g., information regarding orientation and location of the road surfaces. Such information may comprise the number of the one or more lanes 101-103 and/or a geographical position and orientation of each of the one or more lanes of the road 24 based on the obtained sensor data and/or an obtained map data of the road 24.

The control system 10 is further configured for determining a change in a driving behavior of the ego vehicle 1 and/or of at least one external vehicle 2, 3 being present in the surrounding environment of the ego vehicle, on a respective lane on which the ego vehicle 1 and/or the at least one external vehicle 2, 3 is traveling based on the obtained sensor data. Stated differently, the control system 10 of the ego vehicle 1 is configured to register if a change occurs in the driving behavior of the ego vehicle 1 itself, for instance if the ego vehicle 1 is set to operate in autonomous or semi-autonomous mode and/or a change in the driving behavior of the at least one external vehicle 2, 3. The driving behavior in the present context includes but is not limited to a change of speed of the ego vehicle 1 and/or of the at least one external vehicle 2, 3 determined based on the obtained sensor data, and/or a change in the pose or steering of the ego vehicle 1 and/or the at least one external vehicle 2, 3.

The sensor data comprises information indicative of a speed of the ego vehicle 1 and/or of the at least one external vehicle 2, 3. The control system 10 may determine if the ego vehicle 1 and/or any one of the external vehicles 2, 3 has changed its speed at a specific point in time compared to its previously-registered speed. Moreover, it might be determined if the new vehicle speed is maintained by the ego vehicle 1 and/or by the at least one external vehicle 2, 3 for at least a predetermined period of time. The newly adapted speed may be within an acceptable tolerance range and need not be an exact speed value. Additionally or alternatively, the sensor data may comprise the information indicative of the change in pose or steering of the vehicles. Furthermore, the change in the driving behavior determined by the control system 10 is correlated with a meaning, i.e., definition of the at least one identified roadside traffic object 221-223. For instance, assume in the example of FIG. 1 that lane 103 is an exit lane having a lower speed limit 50 km/hour associated with it. One of the observed and identified traffic objects by the ego vehicle 1 is the traffic sign 221 having the definition of the speed limit 50 km/hour. Determining that the vehicle 1 slows down to 50 km/hour speed±ΔV (acceptable speed tolerance around 50 km/hour) while observing a 50 km/hour sign is an indication the change of driving behavior of ego vehicle 1 in the present context is correlated with the definition of the traffic sign 221 and that the ego vehicle 1 has in fact reacted to the observed traffic sign 221. Similarly, the ego vehicle 1 also observes, determines and registers any changes in the driving behavior of the at least one external vehicle 2, 3. In some examples, a change in the driving behavior of the ego vehicle 1 and/or the at least one external vehicle 2, 3 may comprise a change of behavior, e.g., reducing speed performed by the human driver of the vehicle correlated with the definition of the at least one identified roadside traffic object 221-223 observed by the human driver.

Accordingly, the control system 10 is further configured for determining a co-occurrence of the identification of the at least one roadside traffic object 221-223 and determination of the change in the driving behavior of the ego vehicle 1 and/or of the at least one external vehicle 2, 3.

Co-occurrence or coincidence in the present context is to be construed as two or more events occurring together or simultaneously. Stated differently, the co-occurrence of two events describes and comprises either both events happening at the same time or one event happening at a first instance and the other event happening at a second instance different from the first instance but being related to the happening of the event of the first instance. For example, the first event and the second event may both happen at the same time and in the same geographical location. In some other scenarios, the first event may happen in a geographical location and be registered at a first instance, but the second event may happen in the same geographical location as the first event but at a different point in time than the first instance. In either case, the first and the second events may be described as have been co-occurred. Parameters such as the first and second instances as well as the geographical location associated with occurrences of the first and the second events as explained above need not be precise parameters, e.g., an exact point in time and may evidently cover scenarios involving an acceptable range of tolerances for each parameter. The first event in the present context may e.g., be the identification of the at least one roadside traffic object 221-223 and the second event may, e.g., be the determination of the change in the driving behavior of the ego vehicle 1 and/or of the at least one external vehicle 2, 3.

In the instance that the co-occurrence is determined by the control system 10, the control system in further configured for generating a corresponding image annotation for one or more obtained images of the at least one identified roadside traffic object 221-223 to indicate association of the at least one identified roadside traffic object to that lane 103 (in case of ego vehicle 1 observing and reacting to the 50 km/hour traffic sign 221) of the one or more lanes 101-103 associated with the determined change in the driving behavior of the ego vehicle 1 and/or of the at least one external vehicle 2, 3. In other words, when it is determined that the ego vehicle 1 has reacted to the traffic sign 221 on its lane 103 and changed its driving behavior e.g., reducing its speed to 50 km/hour, the control system 10 generates an automated annotation for the one or more obtained images of the traffic sign 221. The generated annotation strongly indicates that the traffic sign 221 belongs to lane 103. In another example, the ego vehicle 1 may observe the change of behavior in the at least one external vehicle 2, changing its speed from the 50 km/hour to 90 km/hour±ΔV (acceptable speed tolerance around 90 km/hour) while changing lanes from the exit lane 103 to lane 102. Similarly, the ego vehicle 1 is configured to determine that the 90 km/hour traffic sign belongs to lane 102 and generate corresponding image annotations for the traffic sign 222 indicating association of the at least one identified roadside traffic object 22 to lane 102.

In several embodiments and aspects the control system 10 is further configured to form a training data set for the ML algorithm based at least on the one or more obtained images of the at least one identified roadside traffic object 221, and the generated image annotation of the at least one annotated traffic object 221.

Machine learning algorithms in the present context may comprise supervised machine learning algorithms, trained, tested and verified based on conventional real-world data which is obtained through driving the ego vehicle 1 on various types of roads under a variety of environmental conditions and for suitable periods of time to collect and evaluate the data sets for various scenarios. HD-map data, positioning data, various sensor measurements including camera, radar, LIDAR, GNSS, IMU, pose of other external vehicles in the surrounding environment of the ego-vehicle 1, geometry and type of lane markers, traffic signs and traffic information, road barriers, weather forecast, etc. may be employed as input data for training the ML algorithm. Additionally or alternatively, in some embodiments and aspects, the control system 10 may be configured for generating image annotations and/or forming the training data set further based on the obtained pose of the ego vehicle and/or the geometry of the road portion comprising number of the one or more lanes and the geographical position and/or orientation of each of the one or more lanes of the road portion 22 based on the obtained sensor data and/or an obtained map data of the road. Additionally or alternatively, in some embodiments and aspect the image annotations and/or training data set may be generated based on the obtained information indicative of the geographical position 221L and orientation of the at least one identified roadside traffic object 221.

In some embodiments and aspects, a trained neural network might be configured to only use the obtained one or more images of the at least one traffic object 221-223 and the generated annotation for the one or more images to affirm an association between the identified at least one traffic object 221-223 and its respective traffic lane amongst a plurality of lanes on the road. In some embodiments and aspects, any metadata associated with the one or more images such as location data of the traffic objections or the one or more lanes, etc. may also be extracted and used. Accordingly, the training data set for the ML algorithm is formed based on the obtained one or more images of the at least one traffic object 221-223 and the generated annotation for the one or more images.

As mentioned above, in some embodiments the control system 10 may be configured to obtain and use additional information such the location and/or orientation of the at least one traffic object to solve the above-mentioned task of traffic object-lane association. Furthermore, the position and/or orientation of each of the plurality of lanes may be used. In some embodiments a neural network may be used to predict the orientation and/or location of lanes and/or the traffic objects based on obtained camera images of the one or more traffic objects or of the one or more lanes. Accordingly by identifying the at least one traffic object and the one or more lanes in the obtained one or more images and using the location and/or orientation information of the at least one traffic object and the one or more traffic lanes also obtained from the one or more images, an ML algorithm such as the trained neural network or a random forest or boosted forest models would be enabled to affirm the association between the identified at least one traffic object 221-223 and its respective traffic lane amongst a plurality of lanes 101-103 on the road 24. Such information may, e.g., be obtained from the localization system 5 of the ego vehicle 1. Even further, the geometry of the road 24 and pose of the ego vehicle 1 and/or one or more external vehicles 2, 3 may be used in addition to the obtained one or more images and their corresponding annotations.

In several embodiments and aspects the control system 10 of the ego vehicle 1 is configured to transmit the formed training data set for the ML algorithm to the remote server 15 for centrally training the ML algorithm. This way an efficient and versatile method and system is provided for automated collection and annotation of massive quantities of data regarding the association of traffic objects to their respective lanes. In addition to turning a costly and challenging manual process of labelling training data to an automated and efficient process, the proposed automated approach also provides a considerable degree of flexibility, scalability and reproducibility by constantly absorbing new information and expanding the database of collected and annotated ML training data. Thus, the ML algorithm will be continuously trained with new data making it ever more accurate.

In some embodiments and aspects, the control system 10 may be configured for training the ML algorithm in a decentralized federated learning setting performed in the ego vehicle 1. The ML algorithm will consequently be trained by updating one or more model parameters of the ML algorithm based on the automated image annotations and training data set formed in the ego vehicle 1. This way the ML algorithm will be trained in the setting referred to as edge training setting. To this end, the control system 10 may be further configured for transmitting the one or more updated model parameters of the ML algorithm to the remote server 15 and receiving a set of globally updated model parameters of the ML algorithm from the remote server 15. The set of globally updated parameters may be based on information comprising the one or more updated model parameters of the ML algorithm obtained from a plurality of ego vehicles 1.

The control system 10 may be further configured to update the ML algorithm based on the received set of globally updated model parameters from the remote server 15. This way a more efficient way of continuously and efficiently updating the ML algorithm to a more accurate prediction model is provided.

In several embodiments, the training data set for the ML algorithm may be formed based on a single training data point acquired at a single timestamp or as a series of training data points acquired at a plurality of timestamps, e.g., provided by one or more ego vehicles 1 collecting and analyzing data at different time instances.

It should be appreciated that the order in which the at least on traffic object 221-223 is identified or the change of behavior of the ego vehicle 1 and/or the at least one external vehicle 2, 3 is determined may be solely based on the system implementation, with either parameter being obtained, processed and provisioned before or after the other.

The control system 10 may be further configured to obtain historic speed data and/or data associated with the change of behavior of the ego vehicle 1 and/or the external vehicles 2, 3 from the cloud network 20 or the remote server 15. The historic data may be gathered by a fleet of vehicles, i.e., a plurality of ego vehicles 1 in communication with the remote server 15 and then inquired and obtained by the ego vehicle 1 upon determination of presence of the at least one traffic object 221-223 on the road portion 22. The real-time and/or historic data may be used in tandem or separately. In an example, the ego vehicle 1 may be the only vehicle travelling in the area 24 at a certain time point without any other external vehicles 2, 3 being present. In such a scenario, upon identification of the at least one traffic object 221-223, the ego vehicle 1 may send an inquiry to the external network 20 to fetch historic data of driving behavior change in the same geographical location and associated with certain lanes of the road 24, obtained and stored from the fleet of vehicles previously. Additionally or alternatively, the collected data for various traffic objects, geographical locations and vehicles may be stored in the remote server or memory of the vehicles and be processed and analyzed later or on demand.

Even further, identification of the roadside traffic objects 221-223 may be performed by the ego vehicle 1 at a certain time point having a first timestamp, while the observation and registration of changes in driving behavior of the vehicles 1, 2, 3 may be performed by another ego vehicle 1 comprised in a plurality of ego vehicles 1 each equipped with the control system of the proposed solution herein. Therefore, the determination of a change in driving behavior may be performed at a different point in time having a second timestamp different from the first time stamp. It should be appreciated that the first event of identification of the traffic objects 221-233 having the first timestamp and the second event of determination of behavior change in the vehicles having the second timestamp are still considered to have co-occurred at the same geographical location even if they are recorded at two different points in time.

In some embodiments and examples, the change of driving behavior of the ego vehicle and/or the external vehicles may be determined by the control system 10 prior to identification of the at least one roadside traffic object 221-223.

In some embodiments, determination of the change of driving behavior of the ego vehicle 1 and/or the external vehicles 2, 3 may be the trigger event for observations made by the sensor system 61 of the ego vehicle 1 for determination of presence of the roadside at least one traffic object 221-223 having a specific definition. In either of these examples and scenarios the co-occurrence of the first event with the second event will be determined regardless of order of determination as mentioned earlier.

In several embodiments the ego vehicle 1 may store the one or more images of the at least one identified traffic object 221-223 in the memory unit 8 of the ego vehicle 1 for a subsequent step of generating a corresponding annotation.

In some embodiments, the control system 10 may be further configured for associating the co-occurrence of identification of the at least one traffic object 2221-223 and determination of change of driving behavior to the obtained geographical positioning data of the ego vehicle 1 and/or the at least one external vehicle. In other words, the geographical location where an event of spotting the at least one traffic object 221-223 and an event of a change of driving behavior have occurred in tandem may be collected and registered every time such a co-occurrence is determined in that geographical location.

In some embodiments the control system 10 may also be configured to indicate the at least one traffic object 221-223 within map data associated with an HD map based on the annotated one or more images and determined association of the at least one traffic object to its specific lane. Thus, the proposed systems and methods herein also provide the advantage of populating an HD-map with the location of the identified and associated at least one roadside traffic object 221-223 in an automated manner.

Figure 3:
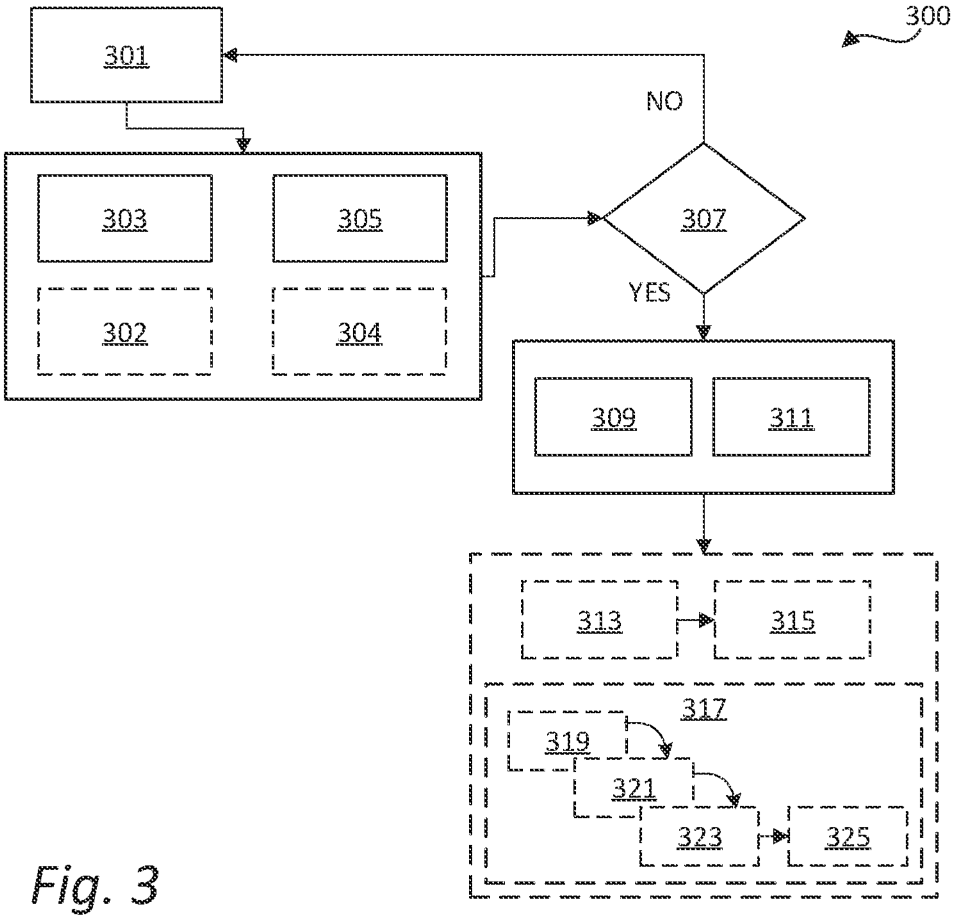
FIG. 3 is a schematic flowchart illustrating a method in accordance with several embodiments of the present disclosure.

FIG. 3 shows a flowchart of a method 300 according to various aspects and embodiments of the present disclosure for generating training data for a machine learning, ML, algorithm configured for assigning at least one roadside traffic object 221-223 on a road 24 having one or more lanes 101-103, to a lane of the one or more lanes. The method comprises obtaining 301 sensor data from a sensor system 61 of an ego vehicle 1 comprising an Automated Driving System, ADS, and traveling on the road 24, the sensor data comprising one or more images, captured by a vehicle-mounted camera 61, of a surrounding environment of the ego vehicle 1. The method 300 further comprises identifying 303 the at least one roadside traffic object 221-223 in the surrounding environment of the ego vehicle 1 based on the obtained sensor data. Further, the method 300 comprises determining 305 a change in a driving behavior of the ego vehicle 1 and/or of at least one external vehicle 2, 3, being present in the surrounding environment of the ego vehicle, on a respective lane on which the ego vehicle and/or the at least one external vehicle is traveling based on the obtained sensor data, wherein the sensor data comprises information indicative of a speed of the ego vehicle 1 and/or of the at least one external vehicle. The change in the driving behavior is correlated with a meaning of the at least one identified roadside traffic object. The method 300 further comprises determining 307 a co-occurrence of the identification of the at least one roadside traffic object and determination of the change in the driving behavior of the ego vehicle and/or of the at least one external vehicle. In an instance of such co-occurrence, i.e., if the co-occurrence is determined, the method 300 further comprises generating 309 a corresponding image annotation for one or more obtained images of the at least one identified roadside traffic object 221-223 to indicate association of the at least one identified roadside traffic object to that lane, of the one or more lanes, associated with the determined change in the driving behavior of the ego vehicle 1 and/or of the at least one external vehicle 2, 3. The method 300 further comprises forming 311 a training data set for the ML algorithm based at least on the one or more obtained images of the at least one identified roadside traffic object, and the generated image annotation of the at least one traffic object.

It shall be noted that all the embodiments, elements, features, examples and advantages described earlier with reference to the control system 10, or the processing circuitry 11 of the control system 10 and FIGS. 1-2 also analogously and equally apply to various embodiments of the method 300 described herein with reference to FIG. 3.

According to some embodiments, the method 300 may further comprise obtaining 302 information associated with the at least one identified traffic object indicative of geographical position and orientation of the at least one identified roadside traffic object. The method 300 may further comprise obtaining 304 a geometry of the road 24 comprising number of the one or more lanes 101-103 and a geographical position and orientation of each of the one or more lanes of the road based on the obtained sensor data and/or an obtained map data of the road. Thus, the method 300 may further comprise generating 309 the corresponding image annotation and/or forming 311 the training data set for the ML algorithm further based on the obtained information associated with the at least one identified traffic object 221-223 and/or the obtained a geometry of the road 24.

In several embodiments the method may further comprise transmitting 313 the formed training data set to a remote server 15 for centrally training 315 the ML algorithm.

Even further, in several embodiments the method may further comprise training 317 the ML algorithm in a decentralized federated learning setting performed in the ego vehicle by updating 319 one or more model parameters of the ML algorithm based on the formed training data set.

The method 300 may thus further comprise transmitting 321 the one or more updated model parameters of the ML algorithm to a remote server 15 and receiving 323 a set of globally updated model parameters of the ML algorithm from the remote server, wherein the set of globally updated parameters are based on information comprising the one or more updated model parameters of the ML algorithm obtained from a plurality of ego vehicles 1. The method may further comprise updating 325 the ML algorithm based on the received set of globally updated model parameters.

In several embodiments, the training data set for the ML algorithm may be formed 311 based on a single training data point acquired at a single timestamp or as a series of training data points acquired at a plurality of timestamps.

Executable instructions for performing these functions and embodiments of the method 300 are, optionally, included in a non-transitory computer-readable storage medium or other computer program product configured for execution by one or more processors.

Figure 4:
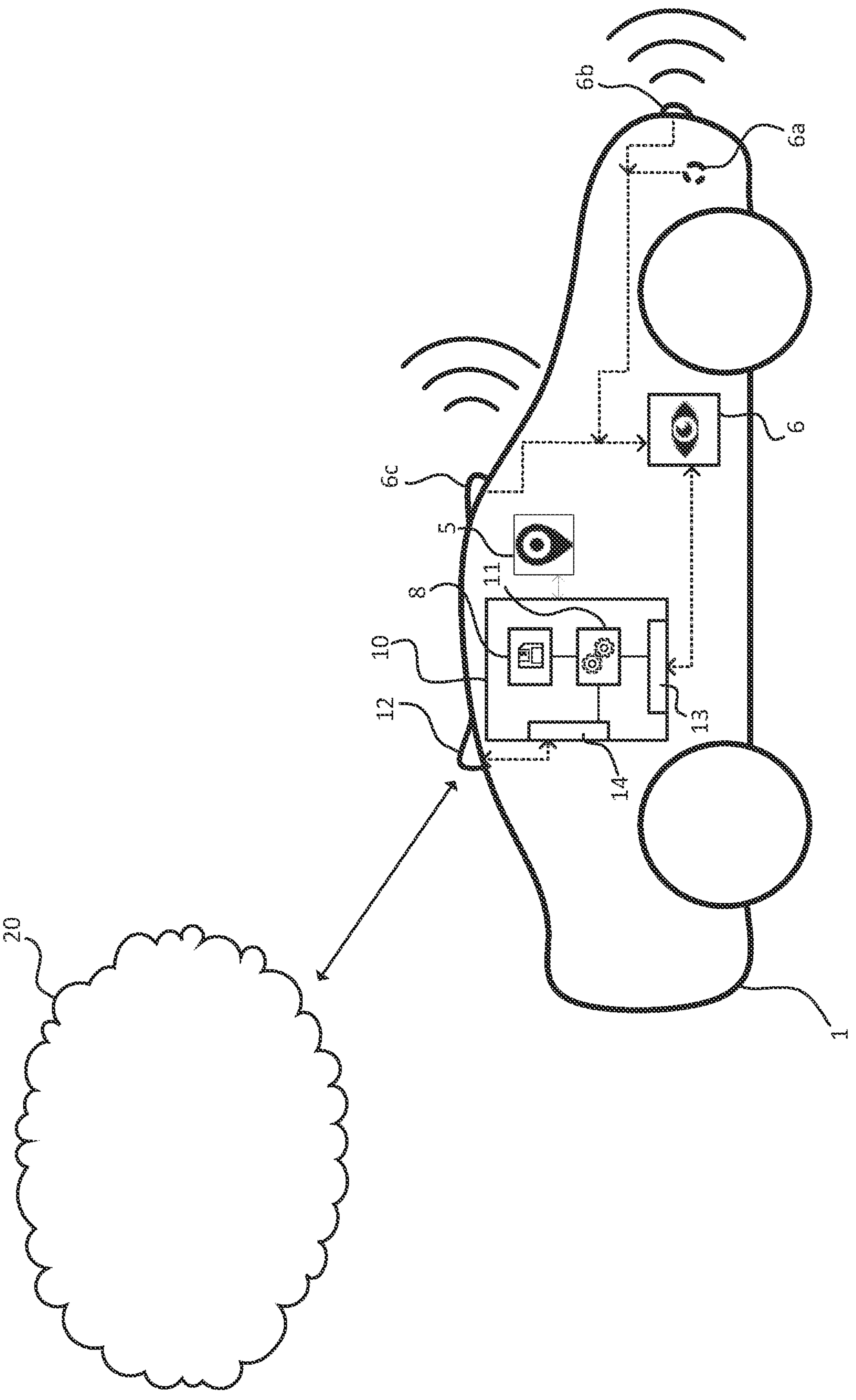
FIG. 4 shows a schematic side view illustration of the vehicle comprising the control system in accordance with some embodiments of the present disclosure.

FIG. 4 is a schematic side view of an ego vehicle 1 comprising a control system 10 (control device 10) for generating training data for a machine learning, ML, algorithm configured for assigning at least one roadside traffic object 221-223 on a road having one or more lanes 101-103, to a lane of the one or more lanes. The vehicle 1 further comprises a perception system 61, also referred to as the sensor system 61, and a localization system 5. A perception system 61 is in the present context to be understood as a system responsible for acquiring raw sensor data from on sensors 61*a*, 61*b*, 61*c* such as cameras, LIDARs and RADARs, ultrasonic sensors, and converting this raw data into scene understanding. In particular, the ego vehicle 1 has at least one vehicle-mounted camera 61*c* for capturing images of at least a portion of a surrounding environment of the vehicle including images of the roadside traffic objects and one or more external vehicles and the road geometry comprising road surfaces, number and orientation of traffic lanes, lane markers, etc. The localization system 5 is configured to monitor a geographical position and heading of the vehicle, and may in the form of a Global Navigation Satellite System (GNSS), such as a GPS. However, the localization system may alternatively be realized as a Real Time Kinematics (RTK) GPS in order to improve accuracy. Moreover, in the present context the vehicle 1 is assumed to have access to a digital map (e.g., a HD-map), either in the form of a locally stored digital map or via a remote data repository accessible via an external communication network 20 (e.g., as a data stream). In some embodiments, the access to the digital map may for example be provided by the localization system 5.

The control system 10 comprises one or more processors 11, a memory 8, a sensor interface 13 and a communication interface 14. The processor(s) 11 may also be referred to as a control circuit 11 or control circuitry 11 or processing circuitry 11 or processing unit 11. The control circuit 11 is configured to execute instructions stored in the memory 8 to perform a method according to any one of several embodiments of the method 300 disclosed herein. The memory 8 of the control device 10 can include one or more (non-transitory) computer-readable storage mediums, for storing computer-executable instructions, which, when executed by one or more computer processors 11, for example, can cause the computer processors 11 to perform the techniques described herein. The memory 8 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices.

Further, the ego vehicle 1 may be connected to external network(s) 20 via for instance a wireless link, e.g., for retrieving map data or communication with the external remote server 15. The same or some other wireless link may be used to communicate with other external vehicles in the vicinity of the vehicle or with local infrastructure elements. Cellular communication technologies may be used for long range communication such as to external networks and if the cellular communication technology used have low latency it may also be used for communication between vehicles, vehicle to vehicle (V2V), and/or vehicle to infrastructure, V2X. Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g., IEEE 802.11 based solutions. ETSI is working on cellular standards for vehicle communication and for instance 5G is considered as a suitable solution due to the low latency and efficient handling of high bandwidths and communication channels.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. In several aspects and embodiments, there is provided a computer program product comprising instructions which, when the program is executed by one or more processors of a processing system, causes the processing system to carry out the method according to any one of the embodiments of the method of the present disclosure.

Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media, e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 11, associated with the control device 10, may be or include any number of hardware components for conducting data or signal processing or for executing computer code stored in memory 8. The device 10 may have an associated memory 8, and the memory 8 may be one or more devices for storing data and/or computer code for completing or facilitating the various methods described in the present description. The memory may include volatile memory or non-volatile memory. The memory 8 may include database components, object code components, script components, or any other type of information structure for supporting the various activities of the present description. According to an exemplary embodiment, any distributed or local memory device may be utilized with the systems and methods of this description. According to an exemplary embodiment the memory 8 is communicably connected to the processor 11, e.g., via a circuit or any other wired, wireless, or network connection and includes computer code for executing one or more processes described herein.

It should be appreciated that the ego vehicle 1 further comprises a sensor interface 13 which may also provide the possibility to acquire sensor data directly or via dedicated sensor control circuitry 61 in the vehicle. The ego vehicle 1 also comprises a communication/antenna interface 14 which may further provide the possibility to send output to a remote location, e.g., remote operator or control centre or remote server by means of an antenna 12. Moreover, some sensors in the vehicle may communicate with the control device 10 using a local network setup, such as CAN bus, I2C, Ethernet, optical fibers, and so on. The communication interface 14 may be arranged to communicate with other control functions of the vehicle and may thus be seen as control interface also; however, a separate control interface (not shown) may be provided. Local communication within the vehicle may also be of a wireless type with protocols such as WiFi, LoRa, Zigbee, Bluetooth, or similar mid/short range technologies.

Accordingly, it should be understood that parts of the described solution may be implemented either in the vehicle, in a system located external the vehicle, or in a combination of internal and external the vehicle; for instance in the remote server 15 in communication with the vehicle, a so called cloud solution 20. In some examples, the ML algorithm may be implemented in the processing circuitry 11. In some examples, sensor data may be sent to an external system, wherein the external system comprises the ML algorithm configured for assigning at least one roadside traffic object on a road having one or more lanes, to a lane of the one or more lanes. The different features and steps of the embodiments may be combined in other combinations than those described.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the disclosure may be at least in part implemented by means of both hardware and software, and that several "means" or "units" may be represented by the same item of hardware.

As used herein, the term "if" may be construed to mean "when or "upon" or "in response to determining or "in response to detecting" depending on the context. Similarly, the phrase "if it is determined' or "when it is determined" or "in an instance of" may be construed to mean "upon determining or "in response to determining" or "upon detecting and identifying occurrence of an event" or "in response to detecting occurrence of an event" depending on the context. The term "obtaining" is herein to be interpreted broadly and encompasses receiving, retrieving, collecting, acquiring, and so forth directly and/or indirectly between two entities configured to be in communication with each other or with other external entities.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, in some cases some of the software implementations may be accomplished with standard programming techniques with rule-based logic and other logic to accomplish the various connection steps, processing steps, comparison steps and decision steps. The above mentioned and described embodiments are only given as examples and should not be limiting to the present disclosure. Other solutions, uses, objectives, and functions within the scope of the disclosure as claimed in the below described patent embodiments should be apparent for the person skilled in the art.

The invention claimed is:

1. A method for generating training data for a machine learning (ML) algorithm configured for assigning at least one roadside traffic object on a road having one or more lanes, to a lane of the one or more lanes, the method comprising:

obtaining sensor data from a sensor system of an ego vehicle comprising an Automated Driving System (ADS) and traveling on the road, the sensor data comprising one or more images, captured by a vehicle-mounted camera, of a surrounding environment of the ego vehicle;

identifying the at least one roadside traffic object in the surrounding environment of the ego vehicle based on the obtained sensor data;

wherein the method further comprises:

determining a change in a driving behavior of the ego vehicle and/or of at least one external vehicle, being present in the surrounding environment of the ego vehicle, on a respective lane on which the ego vehicle and/or the at least one external vehicle is traveling based on the obtained sensor data, wherein the sensor data comprises information indicative of a speed of the ego vehicle and/or of the at least one external vehicle; and wherein the change in the driving behavior is correlated with a meaning of the at least one identified roadside traffic object;

determining a co-occurrence of the identification of the at least one roadside traffic object and determination of the change in the driving behavior of the ego vehicle and/or of the at least one external vehicle; and in response to the determination of co-occurrence:

generating a corresponding image annotation for one or more obtained images of the at least one identified roadside traffic object to indicate association of the at least one identified roadside traffic object to that lane, of the one or more lanes, associated with the determined change in the driving behavior of the ego vehicle and/or of the at least one external vehicle; and forming a training data set for the ML algorithm based at least on the one or more obtained images of the at least one identified roadside traffic object, and the generated image annotation of the at least one identified roadside traffic object.

2. The method according to claim 1, wherein the method further comprises:

obtaining information associated with the at least one identified roadside traffic object indicative of geographical position and orientation of the at least one identified roadside traffic object;

obtaining a geometry of the road comprising one or more lanes and a geographical position and orientation of each of the one or more lanes of the road based on the obtained sensor data and/or an obtained map data of the road; and generating the corresponding image annotation and/or forming the training data set for the ML algorithm is further based on the obtained information associated with the at least one identified roadside traffic object and/or the obtained a geometry of the road.

3. The method according to claim 1, wherein the at least one roadside traffic object is a traffic sign or a traffic signal.

4. The method according to claim 1, wherein the method further comprises:

transmitting the formed training data set to a remote server for centrally training the ML algorithm.

5. The method according to claim 1, wherein the method further comprises:

training the ML algorithm in a decentralized federated learning setting performed in the ego vehicle by:

updating one or more model parameters of the ML algorithm based on the formed training data set.

6. The method according to claim 5, wherein the method further comprises:

transmitting the one or more updated model parameters of the ML algorithm to a remote server;

receiving a set of globally updated model parameters of the ML algorithm from the remote server, wherein the set of globally updated parameters are based on information comprising the one or more updated model parameters of the ML algorithm obtained from a plurality of ego vehicles; and updating the ML algorithm based on the received set of globally updated model parameters.

7. The method according to claim 1, wherein the training data set for the ML algorithm is formed based on a single training data point acquired at a single timestamp or as a series of training data points acquired at a plurality of timestamps.

8. The method according to claim 1, wherein the method is performed by a processing unit of the ego vehicle.

9. A non-transitory computer-readable storage medium storing one or more programs configured to be executed by one or more processors of an in-vehicle processing system, the one or more programs comprising instructions for performing the method according to claim 1.

10. A system for generating training data for a machine learning (ML) algorithm configured for assigning at least one roadside traffic object on a road having one or more lanes, to a lane of the one or more lanes, the system comprising processing circuitry configured to:

obtain sensor data from a sensor system of an ego vehicle comprising an Automated Driving System (ADS) and traveling on the road, the sensor data comprising one or more images, captured by a vehicle-mounted camera, of a surrounding environment of the ego vehicle;

identify the at least one roadside traffic object in the surrounding environment of the ego vehicle based on the obtained sensor data;

determine a change in a driving behavior of the ego vehicle and/or of at least one external vehicle, being present in the surrounding environment of the ego vehicle, on a respective lane on which the ego vehicle and/or the at least one external vehicle is traveling based on the obtained sensor data, wherein the sensor data comprises information indicative of a speed of the ego vehicle and/or of the at least one external vehicle; and wherein the change in the driving behavior is correlated with a meaning of the at least one identified roadside traffic object;

determine a co-occurrence of the identification of the at least one roadside traffic object and determination of the change in the driving behavior of the ego vehicle and/or of the at least one external vehicle; and in response to the determination of co-occurrence, the processing circuitry is further configured to:

generate a corresponding image annotation for one or more obtained images of the at least one identified roadside traffic object to indicate association of the at least one identified roadside traffic object to that lane, of the one or more lanes, associated with the determined change in the driving behavior of the ego vehicle and/or of the at least one external vehicle; and form a training data set for the ML algorithm based at least on the one or more obtained images of the at least one identified roadside traffic object, and the generated image annotation of the at least one identified roadside traffic object.

11. The system according to claim 10, wherein the processing circuitry is further configured to:

obtain information associated with the at least one identified roadside traffic object indicative of geographical position and orientation of the at least one identified roadside traffic object;

obtain a geometry of the road comprising one or more lanes and a geographical position and orientation of each of the one or more lanes of the road based on the obtained sensor data and/or an obtained map data of the road; and generate the corresponding image annotation and/or forming the training data set for the ML algorithm further based on the obtained information associated with the at least one identified roadside traffic object and/or the obtained geometry of the road.

12. The system according to claim 10, wherein the processing circuitry is further configured to transmit the formed training data set to a remote server for centrally training the ML algorithm.

13. The system according to claim 10, wherein the processing circuitry is further configured to:

train the ML algorithm in a decentralized federated learning setting performed in the ego vehicle by updating one or more model parameters of the ML algorithm based on the formed training data set.

14. The system according to claim 13, wherein the processing circuitry is further configured to:

transmit the one or more updated model parameters of the ML algorithm to a remote server;

receive a set of globally updated model parameters of the ML algorithm from the remote server, wherein the set of globally updated parameters are based on information comprising the one or more updated model parameters of the ML algorithm obtained from a plurality of ego vehicles; and update the ML algorithm based on the received set of globally updated model parameters.

15. A vehicle comprising:

one or more vehicle-mounted sensors configured to monitor a surrounding environment of the vehicle;

a localization circuitry configured to monitor a geographical position of the vehicle; and a system for generating training data for a machine learning (ML) algorithm configured for assigning at least one roadside traffic object on a road having one or more lanes, to a lane of the one or more lanes, the system comprising a processing circuitry configured to:

obtain sensor data from a sensor system of an ego vehicle comprising an Automated Driving System (ADS) and traveling on the road, the sensor data comprising one or more images, captured by a vehicle-mounted camera, of a surrounding environment of the ego vehicle;

identify the at least one roadside traffic object in the surrounding environment of the ego vehicle based on the obtained sensor data;

determine a change in a driving behavior of the ego vehicle and/or of at least one external vehicle, being present in the surrounding environment of the ego vehicle, on a respective lane on which the ego vehicle and/or the at least one external vehicle is traveling based on the obtained sensor data, wherein the sensor data comprises information indicative of a speed of the ego vehicle and/or of the at least one external vehicle; and wherein the change in the driving behavior is correlated with a meaning of the at least one identified roadside traffic object;

determine a co-occurrence of the identification of the at least one roadside traffic object and determination of the change in the driving behavior of the ego vehicle and/or of the at least one external vehicle; and in response to determination of co-occurrence, the processing circuitry is further configured to:

generate a corresponding image annotation for one or more obtained images of the at least one identified roadside traffic object to indicate association of the at least one identified roadside traffic object to that lane, of the one or more lanes, associated with the determined change in the driving behavior of the ego vehicle and/or of the at least one external vehicle; and form a training data set for the ML algorithm based at least on the one or more obtained images of the at least one identified roadside traffic object, and the generated image annotation of the at least one identified roadside traffic object.

* * * * *